United States Patent Office 3,538,050
Patented Nov. 3, 1970

3,538,050
PROCESS FOR CURING EPOXY RESINS WITH NITRILO TRIS(N-ACETAMIDES)
Raymond R. Hindersinn, Lewiston, and Charles H. Ilardo, Tonawanda, N.Y., assignors to Hooker Chemical Corporation, Niagara Falls, N.Y., a corporation of New York
No Drawing. Filed June 28, 1968, Ser. No. 740,855
Int. Cl. C08g 30/14
U.S. Cl. 260—47                                    16 Claims

ABSTRACT OF THE DISCLOSURE

There is provided a process for curing epoxy resins which comprises heating a mixture of (1) an epoxy resin and (2) a compound of the formula

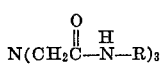

wherein R is a hydrogen atom or a hydrocarbon group containing from 1 to 11 carbon atoms, including alkyl, aryl, cycloalkyl and aminoalkyl. An amine can be employed to improve the process.

BACKGROUND OF THE INVENTION

New curing agents for epoxy resins have been discovered. The new agents are prepared from nitrilotriacetic acid which is advantageous because of the economy involved when the nitrilotriacetic acid is employed.

It is the object of this invention to provide new curing agents for epoxy resins. It is also the object of this invention to provide curing agents which are economical to prepare. Other objects will become apparent to those skilled in the art from the following detailed description.

SUMMARY OF THE INVENTION

This invention relates to new curing agents for epoxy resins, and more particularly, to new curing agents for epoxy resins having the formula

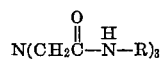

wherein R is selected from the group consisting of hydrogen, alkyl, aryl, cycloalkyl and aminoalkyl of 1 to 11 carbon atoms. In a preferred embodiment an amine is employed in conjunction with the curing agent.

DESCRIPTION OF THE PREFERRED EMBODIMENT

In accordance with the invention, there is provided a curing agent of the formula

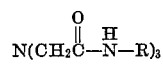

wherein R is selected from the group consisting of hydrogen, alkyl, aryl, cycloalkyl and aminoalkyl of 1 to 11 carbon atoms. Typical R groups are hydrogen, ethyl, allyl, butyl, octyl, decyl, cyclopentyl, cyclohexyl, butylcyclohexyl, phenyl, tolyl, xylyl, benzyl, phenylethyl, phenylbutyl, aminoethyl, aminopropyl, aminobutyl, and various isomers and analogs thereof. The three R groups in any given compound may be the same or different.

The compounds of the formula

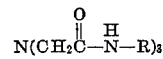

can be prepared by the process of copending application S. N. 741,201 filed June 28, 1968. Briefly, that process entails forming an ester of nitrilotriacetic acid with a glycol in the presence of excess glycol, which thermoesterification can readily proceed without the use of catalysts. The glycol ester produced, which may contain some polyester, undergoes rapid ammonolysis at from ambient temperatures to about 100 degrees centigrade to prepare the nitrilotriacetamides in excellent yields.

The polymers cured by the process of this invention are any of those materials known in the art as epoxy resins. Included with this classification are resins such as the well known reaction products of a dihydric phenol and a halohydrin, epoxidized hydrocarbons, epoxidized vegetable oils, as well as naturally occurring materials of the same type containing the oxirane ring structure. By the terms "epoxy resin or poly-epoxide" as used herein is meant the compounds which contain adjacent carbon atoms to which oxirane oxygen is attached. The epoxy resins that are the reaction products of a dihydric phenol and halohydrin are generally obtained by reacting at a temperature of about 50 to 150 degrees centigrade at least one mole of the halohydrin, such as epichlorohydrin, glycerol dichlorohydrin, 3 - chloro-1,2-propanediol, and the like, with one mole of the dihydric phenol, such as resorcinol, dihydroxy diphenylmethane, polyhydric phenol formaldehyde condensation products, and the like, in the presence of an alkali metal hydroxide such as sodium and potassium hydroxide, or an alkaline earth hydroxide such as calcium and barium hydroxide. The epoxy resins which are formed by epoxidizing unsaturated hydrocarbons can be prepared, for example, by reacting the unsaturated polyolefin, such as polyethylene, polypropylene, polybutadiene, and the like, with a suitable reactant such as acetyl peroxide for several hours at an elevated temperature. Another type of epoxy resin useful in this invention are the polyepoxides derived from naturally occurring vegetable oils, or their derivatives, such as epoxidized soybean oil, epoxidized linseed oil, epoxidized glycerol dilinoleate, and the like. Such materials are prepared, for example, by agitating the compound to be epoxidized with a peracetic acid solution, prepared from glacial acetic acid, 30 percent hydrogen peroxide and one percent sulfuric acid catalyst.

In the practice of the invention, the nitrile tris (N-acetamide curing agent is mixed with the desired uncured epoxy resin at room temperature or at an elevated temperature. The curing agent is preferably incorporated in an amount from about 2 to about 40 parts by weight per 100 parts of uncured epoxy resin, and preferably from about 5 to about 15 parts by weight. The curing temperatures vary over a wide range from 50 to about 250 degrees centigrade, but preferably in the range of about 100 to about 200 degrees centigrade. The amount of time necessary to effect curing varies with the particular ingredients of the curing system, from several minutes to several days, however, it is preferably from about 0.5 to about 48 hours.

In a preferred embodiment of the invention an amine is employed in conjunction with the NTA curing agent. Typical amines are ethylamine, monoethanolamine, formamide, aniline, N-aminoethyl morpholine, ethylenediamine, diethylene triamine, triethylene tetraamine, propylene diamine, 3,3'-biphenyl diamine, piperazine, triethyl amine, dimethyl - sec - butylamine, N - methyl-N-ethylaniline, and the like. The preferred amine is diethylene triamine. The amine generally contains 1 to 5 amino groups and 1 to 20 carbon atoms, and is employed in concentrations varying from about 0.1 to 20 weight percent based on the weight of the epoxy resin.

A variety of other additives can be incorporated into the epoxy resin to modify the properties of the ultimately cured resin product. These additives include reactive liquid diluents such as trimethyl phosphate, triphenyl phosphite, and the like, plasticizers such as dioctylphthalate, liquid polysulfide rubbers, liquid polyamides, aliphatic epoxides, and the like; reinforcing agents such as fibers in the form of cloth, mat, or chopped strands or stable; inert fillers such as alumina, silica glass, calcium carbonate, quartz, iron oxide, graphite, titanium dioxide, asbestos, and the like; thickening agents such as certain silicas, bentonite, and the like; and a variety of colorants.

The following examples are presented to further illustrate the invention, but are not intended to limit it. All parts and percentages are by weight and temperatures in degrees centigrade unless specified otherwise.

PREPARATION OF CURING AGENTS

Example 1

A charge of 3504 grams ethylene glycol and 1518 grams nitrilotriacetic acid were placed in a 5 liter flask. A nitrogen sparge was employed and esterification carried out at 200–205 degrees centigrade. After 5 hours, the esterification was complete as indicated by an acid number of less than one. The flask was cooled to 86 degrees centigrade and ammonia gas bubbled in while the flask continued cooling. When the addition of ammonia was completed after 2 hours, the temperature was 38 degrees centigrade and the nitrilotriacetamide had crystalled out. The mixture was cooled to 25 degrees centigrade and filtered on a vacuum filter. The filtrate was washed with methane and dried at 65–70 degrees centigrade.

Example 2

The glycol ester of nitrilotriacetic acid was prepared as described in Example 1. This was separated into smaller batches for reaction with various amines. A charge of 735 grams of the crude glycol ester and ethylene glycol was placed in a flask and 145 grams of monomethylamine was added, and the flask was maintained at 25 degrees centigrade. Thereafter, the glycol was removed by vacuum distillation at a temperature of 125 degrees centigrade and a pressure of 25 millimeters of mercury. The residue was cooled, acetone added to crytallize the nitrilotris (N-methylacetamide) and the crystals filtered off and dried. 270 grams of the product was recovered, which represents a yield of 89.5 percent.

Example 3

Following the procedure of Example 2, but substituting monobenzylamine, nitrilo tris (N-benzylacetamide) was prepared in a 96.5 percent yield.

Example 4

Following the procedure of Example 1, 189 grams of ethylenediamine was added dropwise over a period of 1 hour at 28–34 degrees centigrade to a mixture comprised of 528 grams of the trioctyl ester of nitrilotriacetic acid, 120 grams of ethylene glycol, and 500 grams of octyl alcohol. The mixture was transferred to a separatory funnel and the lower layer containing the curing agent was drawn off. 296 grams of $$N(CH_2\overset{O}{\overset{\|}{C}}-\overset{H}{\overset{|}{N}}-CH_2CH_2-NH_2)_3$$

were produced, which represents a 93.4 percent yield.

CURING OF EPOXY RESINS

Example 5

Ten parts by weight of nitrilotriacetamide, 1 part diethylene triamine and 100 parts liquid epoxy resin of the bisphenol A-epichlorohydrin type were mixed and subjected to a 120 degrees centigrade cure for 24 hours. The resultant resin was hard at room temperature. In contrast, when the same epoxy resin was subjected to the same cure cycle with 1 part diethylene triamine, after 24 hours the system was still liquid.

Examples 6–7

The following curing systems were subjected to a two-stage cure of 24 hours at 120 degrees centigrade and 24 hours at 180 degrees centigrade. The concentrations, and Barcol hardness and heat distortion temperature of the cured products are reported in Table 1. The curing agent employed was nitrilo tris (N-methylacetamide). The epoxy resin was of the bisphenol A-epichlorohydrin type.

TABLE I

| Example | Epoxy resin, pts. | Curing agents, pts. | Diethylene triamine, pts. | Barcol hardness | Heat distortion temperature, °C. |
|---|---|---|---|---|---|
| 6 | 100 | 10 | | 19 | 76 |
| 7 | 100 | 10 | 1 | 21 | 92 |

Example 8

A system containing 100 parts liquid epoxy resin of Example 5, 10 parts nitrilo tris (N-benzylacetamide) and 1 part diethylene triamine was cured at 120 degrees centigrade for 7 days to produce a hard, rigid epoxy resin at room temperature. A post cure of 24 hours at 180 degrees centigrade yielded a hardened epoxy resin with a Barcol hardness of 32.

A control sample consisting of 100 parts of the same liquid epoxy resin and 1 part diethylene triamine would not gel using the same cure schedule.

Examples 9–12

Various amounts of the product of Example 4 were mixed with 100 parts of a liquid epoxy resin and subjected to three different cure schedules. The concentrations, Barcol hardness and heat distortion temperature for the various systems and cure schedules are shown in Table II.

TABLE II

| Example | 9 | 10 | 11 | 12 |
|---|---|---|---|---|
| Curing agent, parts | 10 | 12.5 | 15 | 20 |
| Barcol hardness heat distortion temperature, °C.[1] | 13 | 15 | 21 | 24 |
| | 44 | 43 | 60 | 65 |
| Barcol hardness heat distortion temperature, °C.[2] | 30 | 32 | 32 | 26 |
| | 65 | 69 | 75 | 67 |
| Barcol hardness heat distortion [3] | 30 | | | |
| | 88 | | | |

[1] 24 hours at 120° C.
[2] 24 hours at 150° C.
[3] 24 hours at 120° C., thereafter 24 hours at 180° C.

Various modifications can be made in the invention without departing from the spirit and the scope thereof. The various embodiments of the invention disclosed herein serve to further illustrate the invention but are not intended to limit it.

We claim:

1. A process for curing epoxy resins which comprises heating a mixture of ingredients comprising (1) an epoxy resin wherein the oxirane oxygen is attached to adjacent carbon atoms and (2) a compound of the formula $$N(CH_2\overset{O}{\overset{\|}{C}}-\overset{H}{\overset{|}{N}}-R)_3$$

wherein R is selected from the group consisting of hydrogen, an aminoalkyl radical of 1 to 11 carbon atoms, and a hydrocarbon radical of 1 to 11 carbon atoms.

2. The process of claim 1 wherein R is hydrogen.
3. The process of claim 1 wherein R is methyl.
4. The process of claim 1 wherein R is benzyl.
5. The process of claim 1 wherein R is

—(CH$_2$CH$_2$NH$_2$)

6. The process of claim 1 wherein said mixture is heated to about 50 to about 250 degrees centigrade.

7. A process for curing epoxy resins which comprises heating a mixture of ingredients comprising (1) an epoxy resin wherein the oxirane oxygen is attached to adjacent carbon atoms, (2) a compound of the formula $$N(CH_2\overset{O}{\overset{\|}{C}}-\overset{H}{\overset{|}{N}}-R)_3$$

wherein R is selected from the group consisting of hydrogen, an aminoalkyl radical of 1 to 11 carbon atoms, and a hydrocarbon radical of 1 to 11 carbon atoms, and (3) an amine.

8. The process of claim 7 wherein the amine is diethylenetriamine.
9. The process of claim 7 wherein R is hydrogen.
10. The process of claim 7 wherein R is methyl.
11. The process of claim 7 wherein R is benzyl.
12. The process of claim 7 wherein R is

—(CH$_2$CH$_2$NH$_2$)

13. The process of claim 7 wherein said mixture is heated to about 50 to about 250 degrees centigrade.
14. A composition comprising (1) an epoxy resin wherein the oxirane oxygen is attached to adjacent carbon atoms, and (2) a compound of the formula $$N(CH_2\overset{O}{\overset{\|}{C}}-\overset{H}{\overset{|}{N}}-R)_3$$

wherein R is selected from the group consisting of hydrogen, an aminoalkyl radical of 1 to 11 carbon atoms, and a hydrocarbon radical of 1 to 11 carbon atoms.
15. A composition comprising (1) an epoxy resin wherein the oxirane oxygen is attached to adjacent carbon atoms, and (2) a compound of the formula $$N(CH_2\overset{O}{\overset{\|}{C}}-\overset{H}{\overset{|}{N}}-R)_3$$

wherein R is selected from the group consisting of hydrogen, an aminoalkyl radical of 1 to 11 carbon atoms, and a hydrocarbon radical of 1 to 11 carbon atoms.
16. The cured reaction product of components comprising (1) an epoxy resin wherein the oxirane oxygen is attached to adjacent carbon atoms, (2) an amine, and (3) a compound of the formula $$N(CH_2\overset{O}{\overset{\|}{C}}-\overset{H}{\overset{|}{N}}-R)_3$$

wherein R is selected from the group consisting of hydrogen, an aminoalkyl radical of 1 to 11 carbon atoms, and a hydrocarbon radical of 1 to 11 carbon atoms.

References Cited
UNITED STATES PATENTS
Handbook of Epoxy Resins, Lee et al., July 1967 (pp. 5–35).

WILLIAM SHORT, Primary Examiner

T. E. PERTILLA, Assistant Examiner

U.S. Cl. X.R.

260—2, 29.1, 18, 37, 59, 88.3, 830